United States Patent
Crummey et al.

(10) Patent No.: US 6,754,240 B1
(45) Date of Patent: Jun. 22, 2004

(54) FORMAT FOR AN OPTICAL DATA LINK

(75) Inventors: Thomas Crummey, London (GB); Richard John Fergusson, Skelmorlie (GB); Shaun Kerigan, Kilmalcolm (GB); Philip Lane, Herts (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,553

(22) Filed: Jul. 14, 1999

(30) Foreign Application Priority Data

Jul. 14, 1998 (GB) .............................................. 9815132

(51) Int. Cl.$^7$ ................................................. H04J 12/56
(52) U.S. Cl. ...................................... 370/537; 370/538
(58) Field of Search ................................ 370/536, 537, 370/538, 539, 540, 541, 542, 544

(56) References Cited

U.S. PATENT DOCUMENTS

| | | | | | |
|---|---|---|---|---|---|
| 4,092,676 A | * | 5/1978 | Saran | .......................... | 382/245 |
| 4,587,650 A | * | 5/1986 | Bell | .......................... | 370/454 |
| 4,637,014 A | * | 1/1987 | Bell et al. | .................... | 370/449 |
| 4,763,321 A | * | 8/1988 | Calvignac et al. | ........... | 370/236 |
| 4,914,650 A | * | 4/1990 | Sriram | ........................ | 370/235 |
| 5,392,280 A | * | 2/1995 | Zheng | ......................... | 370/231 |
| 5,835,498 A | * | 11/1998 | Kim et al. | ................ | 348/423.1 |
| 6,185,632 B1 | * | 2/2001 | Berkema | ...................... | 710/20 |

* cited by examiner

*Primary Examiner*—Ajit Patel
*Assistant Examiner*—William Schultz
(74) *Attorney, Agent, or Firm*—Dillon & Yudell, LLP; Carlos Munoz-Bustamante (57) ABSTRACT

An isochronous output data stream format which is time multiplexed and has a fixed time period where input isochronous data streams are multiplexed into the output isochronous data stream and the output data stream is the same data rate as the fastest input isochronous data stream. One or more of the input data streams contain a code which has been run length limited and/or has a zero running digital sum with banded disparity. In another embodiment, an isochronous output data stream format which is time multiplexed and has a fixed time period where input isochronous data streams are multiplexed into the output isochronous data stream and the output data stream is the sum of the maximum input isochronous data streams. One or more of the data streams contain a code which has been run length limited and/or has a zero running digital sum with banded disparity.

20 Claims, 7 Drawing Sheets

FORMAT FOR AN OPTICAL DATA LINK

RELATED APPLICATIONS

The present invention is related to the following pending application:

Application Ser. No. 09/353,724, filed Jul. 14, 1999, and entitled "OPTICAL DATA LINK SYSTEM" (further identified as Attorney Docket No. UK9-98-027).

Application Ser. No. 09/353,271, filed Jul. 14, 1999, and entitled "MULTIPLE SYNCHRONOUS DATA STREAM FOR AN OPTICAL DATA LINK" (further identified as Attorney Docket No. UK9-98-071).

TECHNICAL FIELD

The present invention relates to fibre optic data links and in particular to the merging of multiple separate input data streams into a single data stream for transmission. More particularly, the invention relates to an isochronous output data stream format which is time multiplexed.

BACKGROUND ART

Prior art methods of data transmission require multiple wire, high cost cables and suffer from limited transfer distance, degraded Front of screen (FOS) performance and Electro-Magnetic Compatibility (EMC) problems. The majority of computer systems at present utilise CRT monitor display systems and it is the analogue nature of the signals required by these display monitors which is responsible for imposing the distance limits over which the data can be delivered. As LCD flat panel monitors become more prevalent, due to decreasing costs, it is no longer required to deliver the data in an analogue format but to use their native digital format for transmission from the PC system unit to the display. Until recently this has been achieved by a double conversion process, firstly digital-analogue and secondly analogue to digital, which allowed the industry standard analogue interface to be used but suffers the problems referred to above and also further signal degradation from the double conversion process.

Fibre optic data links are well known and have the advantages of good noise immunity and high bandwidth. The current technology of fibre optic data links is generally designed for telecommunications applications in which communications over distances of tens of kilometres is required with a very low error rate. Such links are asynchronous digital links having multiple input data streams, and include, for example, ISDN. The data structures in the fibre optic link are very different to that used by the equipment between which communication is taking place by means of the fibre optic link.

Whilst such known fibre optic links work well for telecommunications applications at, for example, 1.0 Gigabits/sec or at 2.4 Gigabits/sec, the cost of the link is high. In telecommunications applications, this cost is shared by the multiple separate pieces of equipment which are using the fibre optic link to communicate.

The benefits of good noise immunity and high bandwidth mean that the use of fibre optic links for non-telecommunications applications is increasing. Such applications are distinguished from telecommunications applications by virtue of the fact that they rarely exceed 150 metres in length and are frequently as short as 2 metres in length. The cost of a telecommunications type of fibre optic link for such an application is between 10 and 100 times too expensive. The physical size of the equipment for a telecommunications fibre optic data link is too large for easy incorporation into a personal computer, computer display or an input/output sensor. When used as a data link from a personal computer to a computer display, the video data that is sent from the personal computer to the computer display can be permitted to have transmission errors, but the synchronisation (or control) signals cannot be permitted to have transmission errors, otherwise the displayed image will break up and the errors will be visible to the end user.

U.S. Pat. No. 4,863,233 discloses a system for connecting a personal computer to a computer display using three discrete fibre optic cables for each of the Red, Green and Blue video data. Vertical and Horizontal sync signals are added to, for example, the Red and Blue video fibre optic cables. This system is a digital isochronous link having a single input stream.

U.S. Pat. No. 5,132,828 discloses a system for connecting a personal computer to a computer display using a fibre optic cable for each channel of video, the video signals being analog signals. The gain of a video amplifier is compensated to adjust for variations in the gain of the fibre optic link. U.S. Pat. No. 5,132,827 describes a similar system. These systems are analogue video systems.

The information transmitted over a data link can be split into two types of information, asynchronous data and isochronous data. The transmission of isochronous data requires predictable, periodic access to the data link. The transmission of asynchronous data does not require such predictable, periodic access.

European Patent 0 174 099 A describes a system for connecting a computer to a computer display using a fibre optic cable. The fibre optic link is bidirectional carrying unidirectional isochronous video data from the computer to the computer display and asynchronous keyboard control and sound synthesis data from the computer to the computer display and asynchronous keyboard input data, mouse input data and speech input data from the computer display to the computer. The clock frequency for the control data is at the same rate as that for the video data and the control data is in the same format as the video data. The control data is time domain multiplexed with the video data. This system is a digital isochronous link having a single input stream, together with a bidirectional asynchronous link having a multiple input streams.

U.S. Pat. No. 5,450,411 discloses a system in which non-isochronous data streams are merged together with isochronous data streams to form an asynchronous ATM data stream for transmission over an ATM link.

U.S. Pat. No. 5,396,494 discloses a system in which an asynchronous packet transmit bus is provided such that isochronous information packets may be transmitted from a source to a destination with a fixed, constant delay. Arbitration is used between the various transmission sources.

U.S. Pat. No. 5,640,392 discloses a system in which isochronous data is received continuously without interruption and irregular asynchronous data is also received. A single isochronous data stream and a single asynchronous data stream is used. FIFOs are used for storing the isochronous and asynchronous data.

U.S. Pat. No. 5,392,280 discloses a system in which both synchronous transmission and asynchronous transmission are used in an alternating pattern. This is achieved by cell level dynamic slot allocation.

U.S. Pat. No. 5,173,901 discloses a system in which synchronous and asynchronous data streams are transmitted over a single transmission link. The time frames of the input and output cell streams are phase synchronous.

U.S. Pat. No. 5,603,058 discloses a video optimised media streamer having communications nodes receiving digital data from a storage node and transmitting the data to adapters for generating isochronous digital data streams.

It would be advantageous if a combined high speed unidirectional isochronous data link together with an interleaved medium speed bidirectional isochronous data link could be provided.

SUMMARY OF THE INVENTION

Accordingly, the invention provides an isochronous output data stream format which is time multiplexed and has a fixed time period where input isochronous data streams are multiplexed into the output isochronous data stream and the output data stream is the same data rate as the fastest input isochronous data stream, wherein one or more of the data streams contain a code which has been run length limited and/or has a zero running digital sum with banded disparity.

The invention also provides an isochronous output data stream format which is time multiplexed and has a fixed time period where input isochronous data streams are multiplexed into the output isochronous data stream and the output data stream is the sum of the maximum input isochronous data streams, wherein one or more of the data streams contain a code which has been run length limited and/or has a zero running digital sum with banded disparity.

Preferably, the word contains a data or control code which has been error detected and corrected.

Further preferably, the time slices are allocated on a predetermined basis.

The invention further provides an n bit word format sent as a single data stream which contains multiple isochronous different data rate data streams either continuous or non-continuous with also asynchronous data stream or streams, wherein the data streams have one or more of the data streams contain a code which has been run length limited and/or has a zero running digital sum with a banded disparity.

Preferably, the word contains a data or control code which has been error detected and corrected.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
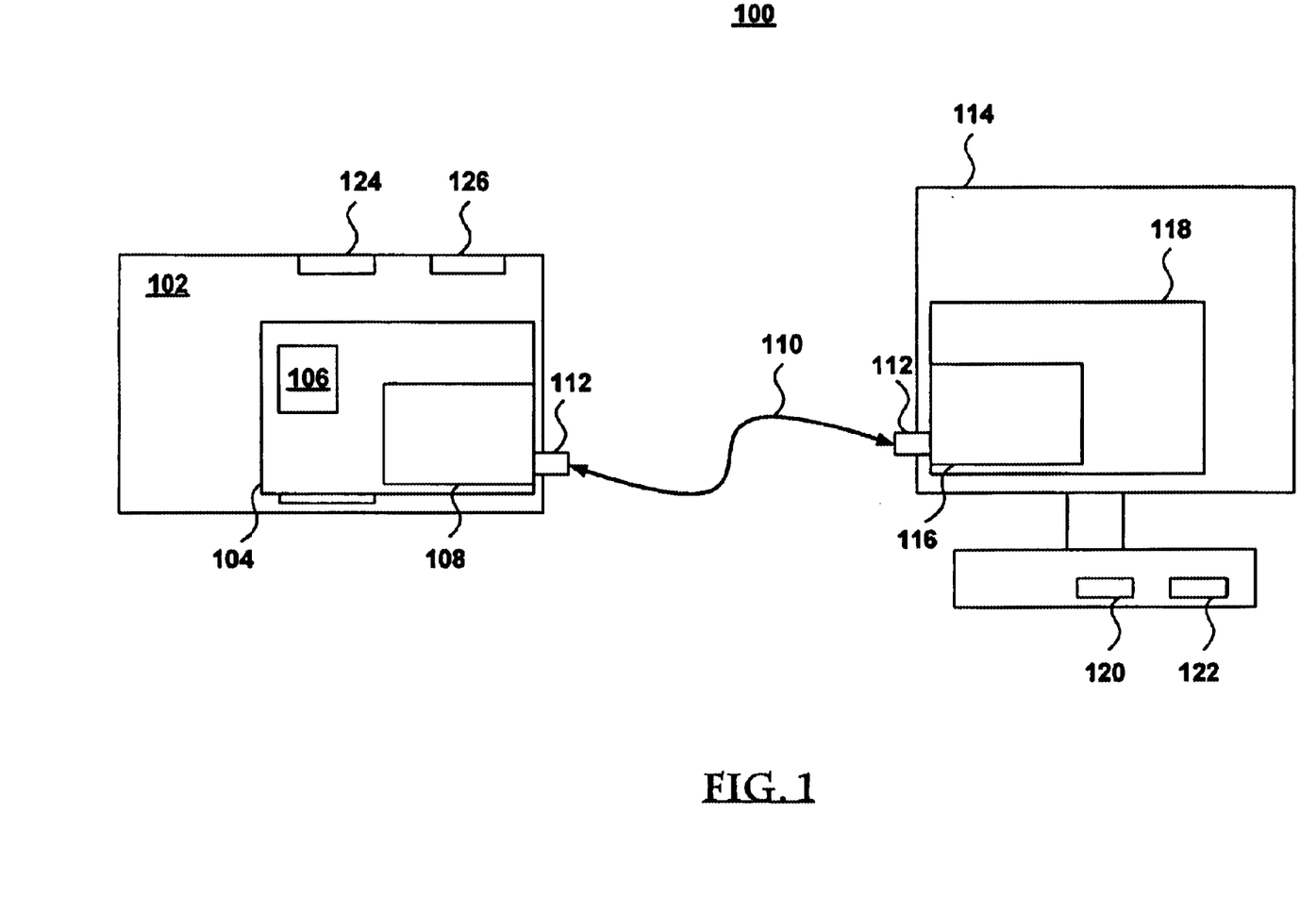
FIG. 1 is a block diagram of a system incorporating the present invention.

The present invention will be described by way of its application to a communications link between a digital adapter in a personal computer and a digital display device. FIG. 1 shows such a system 100. The personal computer 102 includes an adapter card 104 which is connected to an interface bus in the personal computer, such as, for example, a PCI bus. The type of interface bus between the adapter card and the personal computer is not relevant to the operation of the invention. Additionally, the circuitry which will be described with reference to the adapter card may equally well be located on the same circuit card as the processing circuits of the personal computer without affecting the operation of the invention. The adapter card contains a graphics chip set 106 which provides video information for an attached display 114. The adapter card also contains a data encoder 108 for translating the information from the graphics chip set to a format suitable for optical transmission.

The optical data is then transmitted over a bi-directional optical fibre 110 which typically has a length of 2 to 150 metres. The fibre 110 is connected to the personal computer 102 and to the display 114 by means of optical connectors 112, which may be any industry standard optical connector.

When the optical data is received in the display 114, it is first decoded by a data decoder 116 to decode the optical data into electrical data. The data then passes to a display driver card where it is converted to a format suitable for driving the display. Typically the display is a flat panel display, although the invention is also applicable to displays other than flat panel displays.

The display also has connections for other input and output data streams such as a USB bus connector 120 and an IEEE 1394 serial bus connector 122. Further details of the USB can be found in "Universal Serial Bus Specification, Version 1.0" and further details of the IEEE 1394 bus can be found in "IEEE Standard 1394-1995 for a High Performance Serial Bus" (ISBN 1-55937-583-3).

The data transmitted to the computer display consists of video data which is either used to update a shadow refresh buffer in the computer display or is used to refresh the CRT directly without a shadow refresh buffer. Table 1 shows the data rate requirements for a computer display having a shadow buffer in the display and Table 2 shows the data rate requirements for a computer display not having a shadow buffer in the display. The present invention is not limited to use only for the formats shown in tables 1 and 2.

TABLE 1

Update rates for computer displays having shadow buffer in the display

| Format | Resolution | Frame Rate | Pixel Clock | Data Rate (Post Palette) (Megabits/sec) | |
|---|---|---|---|---|---|
| | | Hz | MHz | 12 bpp | 24 bpp |
| VGA | 640 × 480 | 60 | 25 | 300 | 600 |
| | 720 × 400 | 70 | 28 | 336 | 672 |
| SVGA | 800 × 600 | 60 | 40 | 480 | 960 |
| XGA | 1024 × 768 | 30 | 23.59 | 283.08 | 566.16 |
| SXGA | 1280 × 1024 | 30 | 40 | 480 | 960 |
| VXGA | 2048 × 2048 | 30 | 120 | 1444 | 2888 |
| HDTV | 1280 × 720 | 30 | 27.64 | 331.68 | 663.36 |
| | 1920 × 1080 | 30 | 62.20 | 746.4 | 1492.8 |

TABLE 2

Refresh rates for computer displays not having a shadow buffer in the display

| Format | Resolution | Frame Rate | Pixel Clock | Data Rate (Post Palette) (Megabits/sec) | |
|---|---|---|---|---|---|
| | | Hz | MHz | 12 bpp | 24 bpp |
| VGA | 640 × 480 | 60 | 25 | 300 | 600 |
| | 720 × 400 | 70 | 28 | 336 | 672 |
| SVGA | 800 × 600 | 60 | 40 | 480 | 960 |
| XGA | 1024 × 768 | 60 | 65 | 780 | 1560 |
| SXGA | 1280 × 1024 | 60 | 112 | 1344 | 2688 |
| UXGA | 1600 × 1200 | 75 | 250 | 3000 | 6000 |
| GXGA | 2560 × 2048 | 75 | 384 | 4600 | 9200 |
| HDTV | 1280 × 720 | 60 | 77.5 | 930 | 1860 |
| | 1920 × 1080 | 30 (I) | 77.2 | 926.4 | 1852.8 |

Additionally, control data for the display is transferred to and from the display using the DDC format. Further information on the VESA Data Display Channel (DDC) can be found in "VESA Display Data Channel (DDC) Standard, Version 3".

Figure 2:
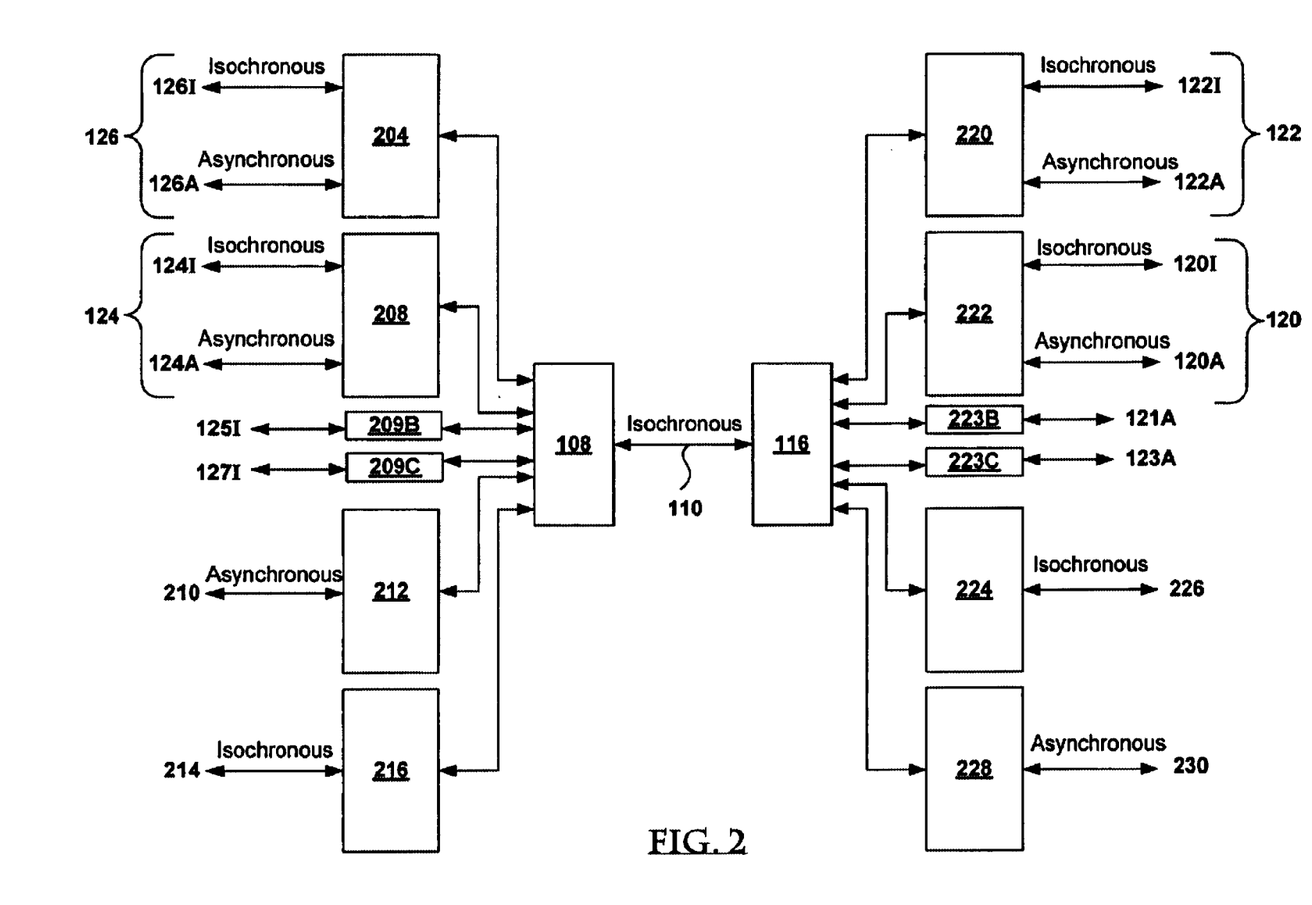
FIG. 2 is a schematic diagram of a system according to the present invention.

FIG. 2 shows a schematic diagram of a system according to the present invention. Isochronous IEEE 1394 data is received and transmitted (126I) from IEEE 1394 driver circuits 204. Asynchronous IEEE 1394 data is received and transmitted (126A) from IEEE 1394 driver circuits 204. The isochronous and asynchronous data flows from connection 126 through encoder 108, optical link 110 and decoder 116 as isochronous data to IEEE 1394 driver circuit 220, where it is split into isochronous data 122I and asynchronous data 122A. Isochronous and asynchronous USB data 124I, 124A from connection 124 is transferred in a similar fashion to connections 120A and 120I.

Asynchronous data 210 is received and transmitted from DDC driver circuits 212. The asynchronous data flows through encoder 108, optical link 110 and decoder 116 to DDC driver circuit 224, where it is transferred to connector 226.

Isochronous video data 214 from video driver circuits 216 flows through encoder 108, optical link 110 and decoder 116 to video driver circuit 228, where it is transferred to connector 230. In contrast to the IEEE 1394, USB and DDC data, which are all bidirectional, the video data is unidirectional data only. There may be any number of IEEE 1394, USB or DDC channels. Additionally, in one embodiment further channels may be provided including, for example, STM channel(s) (with STM driver 209B) and RS-442 channel(s) (with RS-442 driver 209C, being shown in FIG. 2 by between USB driver 208 and DDC driver 212 and for example, 12C channel(s) (with 12C driver 223B) and ATM channel(s) (with ATM driver 223C between USB driver 222 and DDC driver 224. The description of the invention will be completed with reference solely to the primary channels (i.e., IEEE 1394, USB and DDC ) and the described implementations/ features are understood to also extend to these additional channels as well.

Figure 3:
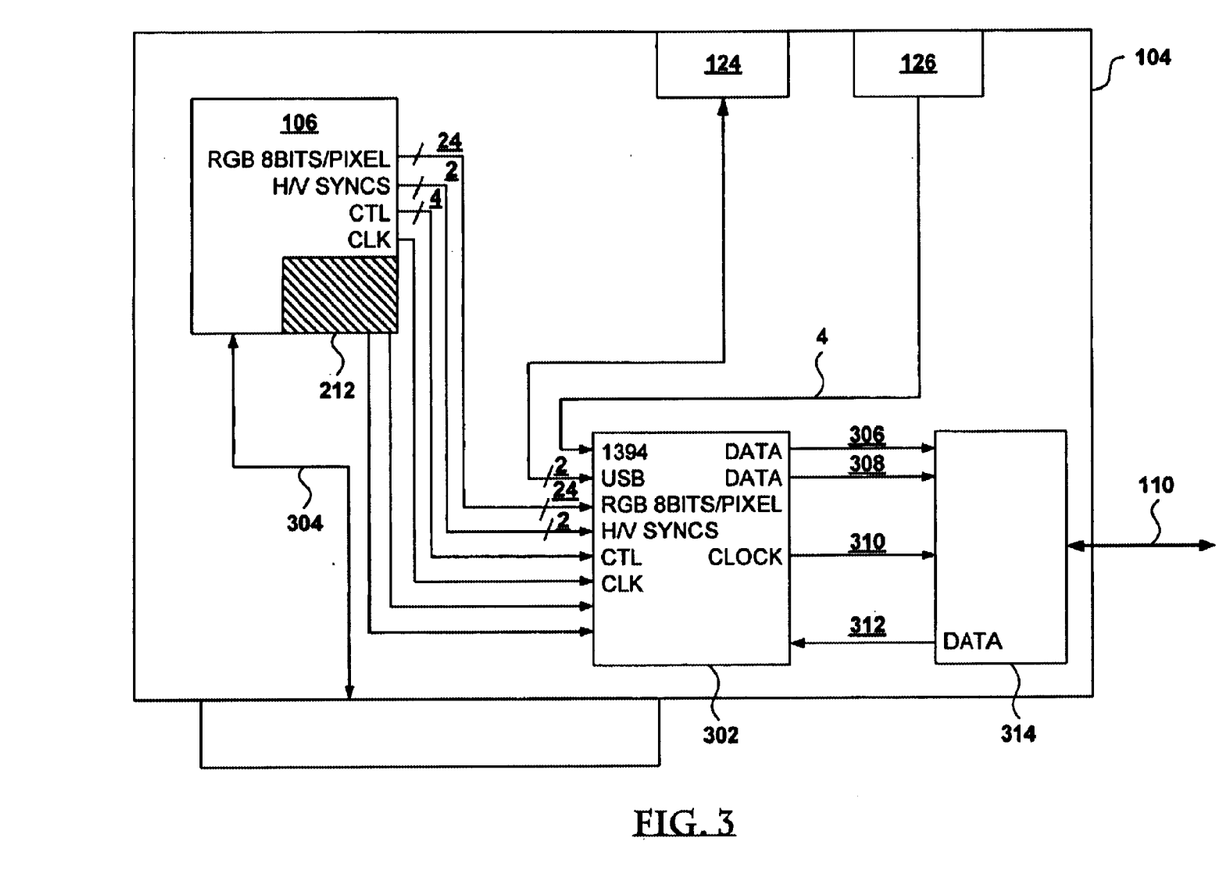
FIG. 3 is a block diagram of an adapter card used in the system of FIG. 1.

FIG. 3 shows a block diagram of an adapter card 104 used in the system of FIG. 1. The adapter card 104 has connections 124 for USB data and 126 for IEEE 1394 data. The graphics chip set 106 produces RGB video data, video control data, display synchronisation signals and a clock signal for use by parallel-serial multiplex encoder 302. These video signals are unidirectional isochronous signals and may be typically 12 bit, 18 bit, 24 bit or 32 bit in format. The invention is equally applicable to other numbers of bits, including numbers greater than 32 bits. For the purposes of description, the present embodiment uses 24 bits. Parallel-serial multiplex encoder 302 converts the 24 bit signals to 26 bit signals and run-length limits (RLL) them. 18 bit format signals received by the parallel-serial multiplex encoder are converted to 24 bit signals by setting the additional 6 bits to zero. The video control signals are encoded to provide error detection and correction in parallel-serial multiplex encoder 302. The video control signals include Data Good, H and V sync, start of frame, EDID good, no data, cal max and cal min.

Additionally, SDA and SCL data are produced from DDC driver 212 located within the graphics chip set and are received by parallel-serial multiplex encoder 302. The DDC signals are bidirectional, asynchronous signals. Graphics chip set 106 has a connection 304 to the personal computer bus. In the preferred embodiment, the personal computer bus is a PCI bus. In an alternative embodiment, the personal computer bus is an AGP bus. Parallel-serial multiplex encoder 302 also transfers data to and from USB connector 124 and IEEE 1394 connector 126. This USB and IEEE 1394 data can be isochronous or asynchronous data or both and is bidirectional data.

The RLL data codes for digital video data, USB data, IEEE 1394 data, DDC data and control hamming code data are merged clock, embed serialised and then DC balanced as is well known in the art. The merged data is now contained within a n bit word. In the preferred embodiment, the value is 32 bits, 24 bits of video data, 5 bits of IEEE 1394 data, 1 bit of USB data and 2 header bits. It is converted from n bit parallel to serial 2 bits wide by multiplexing with pipeline registers to retime the data. The real time bandwidth within the serial data and within the total refresh time slot is allocated isochronously to meet the bus specifications of USB, IEEE 1394 and the data refresh rate requirements.

Parallel-serial multiplex encoder 302 produces 2 bit wide outgoing data signals 306, 308 and an outgoing clock signal 310 for electro-optical converter 314. The n bit encoded word (2 bits wide) is converted to 4 unique light levels at a laser diode, is merged with the return path optical data and is transmitted on fibre optic cable to the display.

Data is received by parallel-serial multiplex encoder 302 from electro-optical converter 314 over connection 312. The return path optical data is converted to binary electrical signals via a pin diode and the clock is recovered in the electro-optical converter 314. The return path data is transferred to parallel-serial multiplex encoder 302 one bit wide where it is decoded into IEEE 1394 data, USB data and DDC data. It is converted from serial to parallel with pipeline registers to retime the data. The IEEE 1394 data, USB data and DDC data are RLL decoded and then separated to their respective original formats. The IEEE 1394 data, USB data and DDC data are converted to their respective specification electrical levels and protocols before being transferred to connectors 126, 124 and the DDC circuitry 212 of graphics chip set 106.

Connections 306, 308, 310 and 312 are preferably implemented using co-axial cable or similar. In an alternative embodiment, electro-optical converter 314 is located in the same integrated circuit as parallel-serial multiplex encoder 302 and so there are no cable connections as such, the connection being contained within the integrated circuit. Electro-optical converter 314 supplies and receives optical data to bi-directional optical fibre 110.

Figure 4:
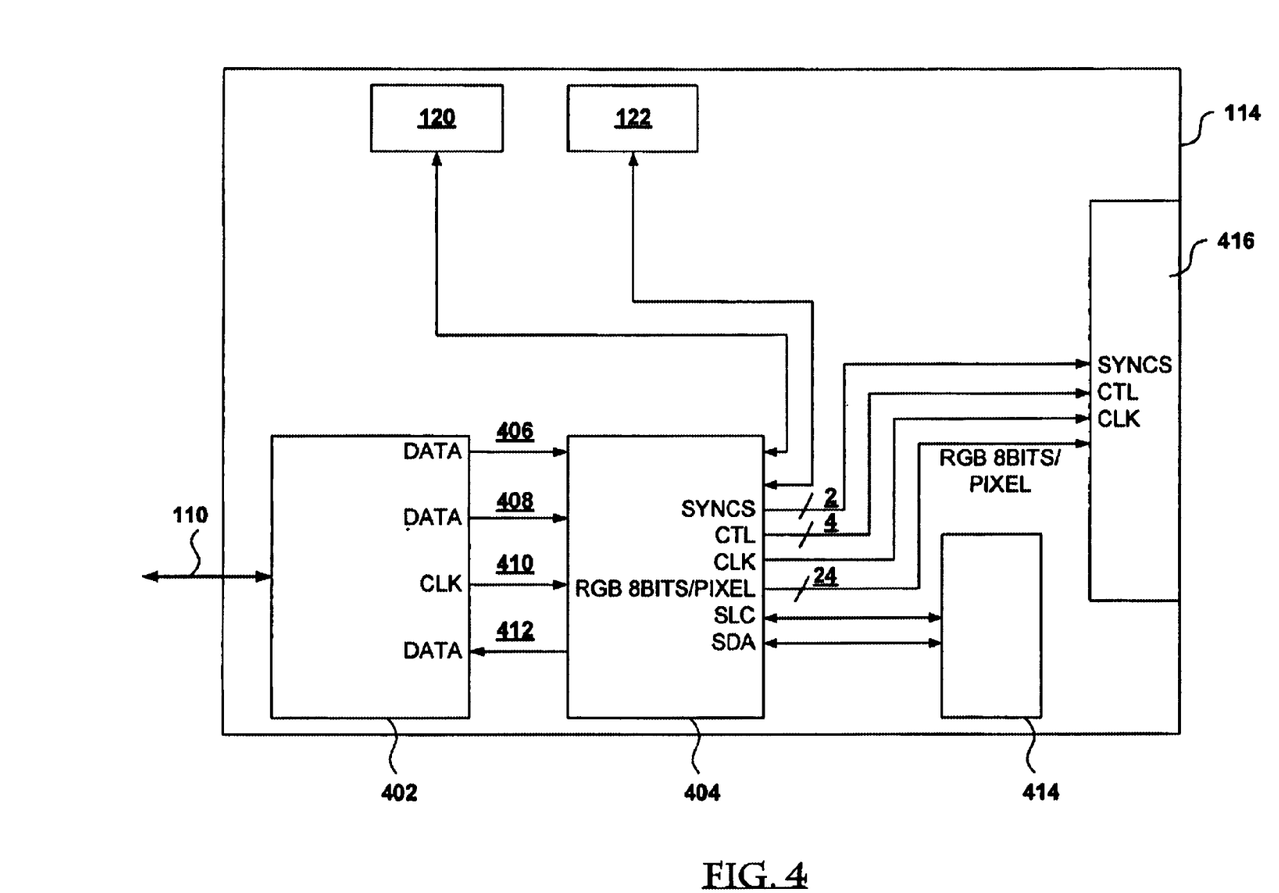
FIG. 4 is a block diagram of a decoder used in the system of FIG. 1.

FIG. 4 shows a block diagram of a decoder used in the system of FIG. 1. Data is received by the optic-fibre receiver circuit 402 from the optical link 110. The receiver circuit 402 converts the data from the optical link 110 from the 4 unique optical light levels to 2 bit wide electrical data signals 406, 408 and a clock signal 410 for the serial-parallel multiplexer 404. The serial-parallel multiplexer 404 converts the n bit data word supplied to it as 2 bit wide electrical data to parallel data with the use of a demultiplexor with pipeline registers to re-time the data without the use of FIFOs. The Synchronisation codes are decoded and error detected and corrected if required. From this decoded data the IEEE 1394 data, USB data, DDC data and Refresh Data Sections of the n-bit data word are separated and RLL decoded back to the original format of the data. The video refresh data with Synchronisation controls is routed to the display connector 408. The USB data is level and protocol converted and is then routed to the USB connector 120. The IEEE 1394 data is level and protocol converted and is then routed to the IEEE 1394 connector 122.

The adapter card 408 has connections 120 for USB data and 122 for IEEE 1394 data. The return path USB data, IEEE 1394 data and DDC data are RLL converted in serial-parallel multiplexer 404 to binary code, transferred over connection 412 and converted to single level optical data in receiver circuit 402. The return path single level optical data is then merged with the incoming four level optical data. Alternatively, separate fibres may be used for the forward path and for the return path.

In another embodiment of the present invention, a sensor is connected to the personal computer 102. This embodiment is represented by FIG. 1 but where a sensor replaces the computer display 114. The USB connection 120 and the IEEE 1394 connection 122 remain unchanged. The direction of the unidirectional isochronous data is from the sensor to the personal computer 102, rather than from the personal computer to the computer display 114.

DDC data may still be sent from the sensor to the personal computer 102.

ENCODING METHODS

Figure 5:
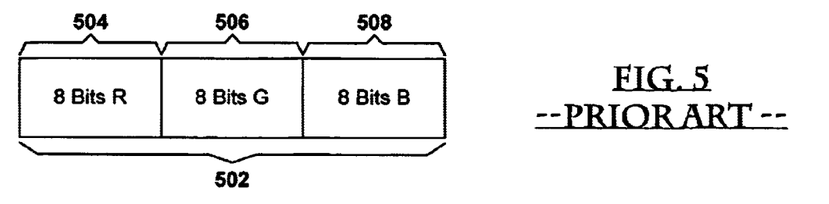
FIG. 5 shows the content of a prior art video data stream.
Figure 6:
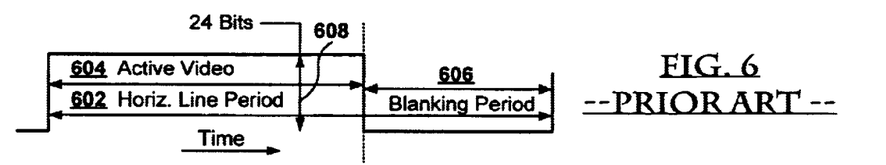
FIG. 6 shows the data that is sent for each horizontal line period of the prior art video data stream of FIG. 5.

FIGS. 5 and 6 show a prior art data stream. Although a 24 bit data word is shown, other prior art systems use 18 bits or 12 bits per pixel formats. These 18 bit and 12 bit prior art data streams can also be used with the encoding format of the present invention as well as the 24 bit embodiment described.

FIG. 5 shows, at 502, a 24 bit data word, 8 bits of data 504 represented Red video, 8 bits of data 506 representing Green video and 8 bits of data 508 representing Blue video.

In the timeline of FIG. 6, the horizontal line period is represented by line 602 and is the time between consecutive line scans. The active video time is represented by line 604 and the blanking period, during which video is not displayed on the screen is represented by line 606. Line 608 represents that for each displayed pixel, (that is, for each pixel clock period) 24 bits of data are sent.

For each of the embodiments of the present invention now described, the data width is increased from the 24 bit width for the raw data to a greater width so as to include items such as bus data (IEEE1394, USB, DDC), headers, run length limiting, error correction, calibration data and flags.

Figure 7:
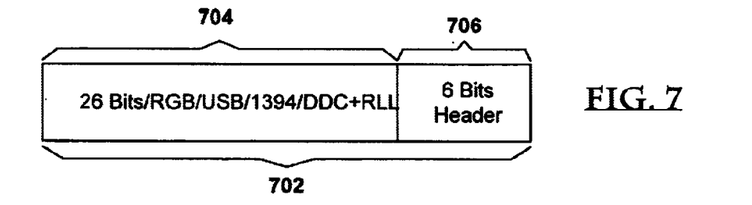
FIG. 7 shows the content of a first embodiment of the video data stream of the present invention using a 32 bit data width.
Figure 8:
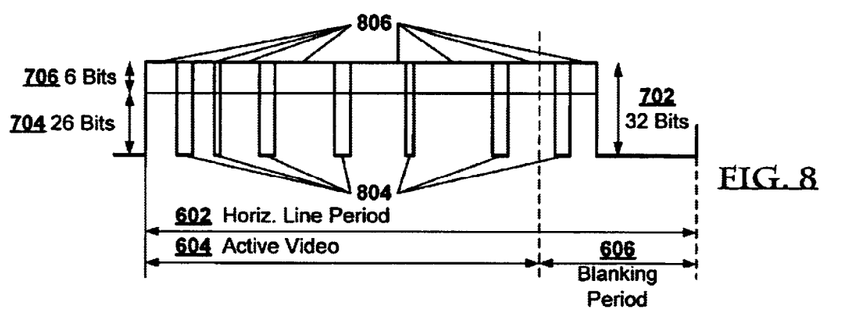
FIG. 8 shows the data that is sent for each horizontal line period of the video data stream of FIG. 7 in which the channel bandwidth is allocated asynchronously on an "as required basis"

FIGS. 7 and 8 show a first embodiment of the data stream format of the present invention which uses a 32 bit data width and the channel bandwidth is allocated asynchronously between video, USB, IEEE1394 and DDC data on an "as required basis", each data type being indicated by the appropriate header. The video pixel clock remains unaltered causing the video and bus information to spill into blanking period. The video information requires buffering to allow it to be retimed.

FIG. 7 shows, at 702, a 32 bit data width, 26 bits 704 representing Red, Green and Blue video data or USB data or IEEE 1394 data or DDC data as well as RLL data and 6 bits 706 representing header and error correction data. The header identifies which of the various types of data are contained within the 26 bits 704.

In the timeline of FIG. 8, the horizontal line period is represented by line 602 and is the time between consecutive line scans. The line 702 represents that for each displayed pixel, (that is, for each pixel clock period) 32 bits of data are sent, although the data being sent at a given time does not always relate to the particular pixel being displayed at that given time. The 32 bits shown at 702 in FIG. 8 represent the 26 bits of data 704 and the 6 bits of data 706 from FIG. 7. The data shown at 806 represents video information containing Red, Green and Blue video data. The data shown at 804 represents the other data, including USB data, IEEE 1394 data, DDC data as well as RLL data. Time slots are allocated for such data asynchronously, on an "as required basis", with the 6 bit header indicating the type of the data The embodiment of FIGS. 7 and 8 has the advantages that the increase in channel data rate is minimised and there is a much reduced latency for data channels. The embodiment of FIG. 7 and 8 requires a coding arrangement as well as video buffering.

Figure 9:
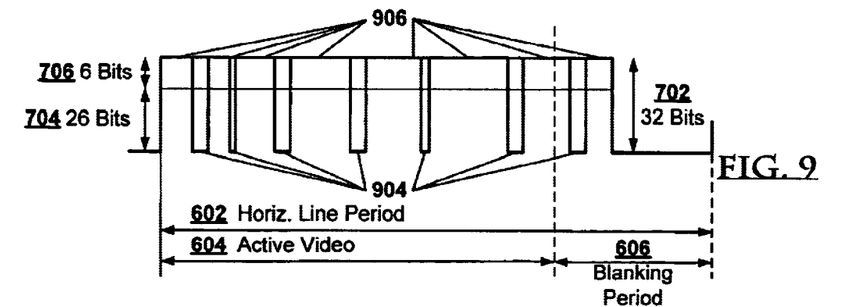
FIG. 9 shows a variation of the embodiment of FIG. 8 in which the bus information is allocated isochronous bandwidths, that is, the channel allocation between bus requirements and video is pre-determined.

FIG. 9 shows a variation of the embodiment of FIGS. 7 and 8 in which the bus information is allocated isochronous bandwidth in order to meet the maximum latency requirement for acknowledgements and lock conditions. As with the embodiment of FIGS. 7 and 8 the video pixel clock remains unaltered and video data spills over into the video blanking period. In addition to the requirements of the embodiments of FIGS. 7 and 8, data buffering is needed as well as video buffering, however the coding arrangement is reduced in complexity since the location of the data channels in the composite data stream is known. The data shown at 806 represents video information containing Red, Green and Blue video data. The data shown at 804 represents the other data, including USB data, IEEE 1394 data, DDC data as well as RLL data. Time slots are allocated for such data isochronously.

In the first embodiment of FIGS. 7 and 8 and the second embodiment of FIG. 9, the only differentiator is the latency in the data. The advantage inherent in the embodiment of FIG. 9 is that the decoder knows where in the video data stream the bus data lies, whilst in the embodiment of FIGS. 7 and 8, the decoder does not. In the embodiment of the data stream of FIGS. 7 and 8, extra decoding is added to read each header to determine whether a word is video or bus data.

In a preferred embodiment of the invention, the following video rates are supported.

| Format | Resolution | Frame Rate | Pixel Clock | Data Rate |
|---|---|---|---|---|
| VGA | 640 × 480 | 60 Hz | 25 MHz | 600 Mbit/s |
| SVGA | 800 × 600 | 60 Hz | 40 MHz | 960 Mbit/s |
| XGA | 1024 × 768 | 60 Hz | 65 MHz | 1560 Mbit/s |

The pixel clock is the rate at which pixels for display on the screen are sent along the data link. The data rate is the rate at which data transfers occur when a 24 bit data word is used, i.e. Data Rate corresponds to 24 bits of data transmitted at the Pixel clock rate.

A system of the preferred embodiment needs to support a 200 Mbit/s data rate for IEEE 1394 together with a 12 Mbit/s data rate of USB data. Additionally 3 Mbit/s is used for error correction and the like. This makes a total required data rate of 215 Mbit/s. Since a data width of 24 bits is used, then 8,958,333 words of 24 bits need to be transmitted each second. The frame rate for all the video rates supported is 60 Hz, so each of the 60 frames each second is required to contain 149,305 24 bit words of data. This figure will be referred to as $N_D$.

The number of 24 bit video words sent in each frame is 307,200 for the 25 Mhz video mode, 480,000 for the 40 MHz video mode and 768,432 for the 65 Mhz video mode. This figure for each mode will be referred to as $N_v$. The percentage of each frame which has to be used for the transmission of IEEE1394 and USB data is therefore represented by $100*N_D/(N_D+N_v)$, that is 32.7% for 25 MHz video mode, 23.7% for 40 MHz video mode and 15.9% for 65 MHz video mode.

In an embodiment supporting 25 MHz video mode, performance can be improved by operating in a clock doubling mode. With this approach a 50 MHz pixel clock is used and alternate words are then available for data.

Figure 10:
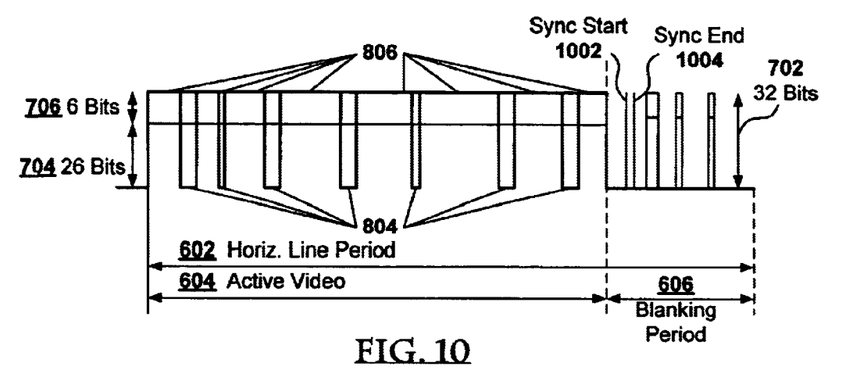
FIG. 10 shows a second embodiment of the data stream format of the present invention in which the video pixel clock is increased, thus allowing the active video line period to remain the same, the extra time periods are then used for bus communication operations which are indicated by differing headers.

FIG. 10 shows a second embodiment of the present invention. In this embodiment, the video pixel clock is increased, thus allowing the active video line period to remain the same, the extra time periods being used for bus communication operations which are indicated by differing headers. The busses are also able to communicate during the video blanking period. The busses are allocated channel capacity asynchronously as required up to a maximum that the increased video clock allows. Video spill over into the blanking period does not occur and buffering of the video information is not required. The data shown at 806 and at 804 represents the same data as represented in FIG. 8, although unlike the data in FIG. 8, the video information does not correspond to the particular pixel being displayed at the time the data is being transmitted, due to the increased video pixel clock. Additional types of header are transmitted to indicate sync signal start and sync signal end for the display. These are shown, for example, at 1002 and 1004 respectively.

This embodiment has the advantage that there is greatly reduced latency for data channels, but requires that the relationship between pixel clock and channel clock is lost, and that video buffering is required because data is arriving at a faster rate than it is used.

Figure 11:
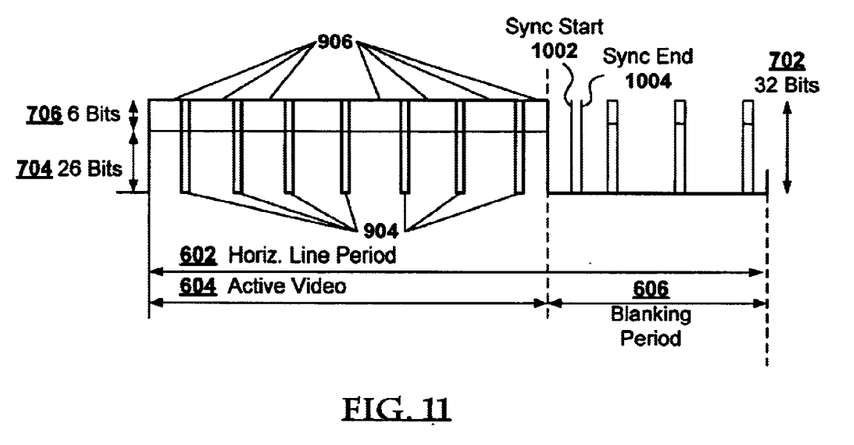
FIG. 11 shows a variation of the embodiment of FIG. 10 in which the bus information is allocated isochronous bandwidths, that is, the channel allocation between bus requirements and video is pre-determined.

FIG. 11 shows a variation of the embodiment of FIG. 10. In this variation, the channel allocation between bus requirements and video is pre-determined to meet the bus system's maximum latency. Data buffering is additionally required in this variation. This variation of FIG. 10, corresponds to FIG. 9 as a variation of FIG. 8.

Figure 12:
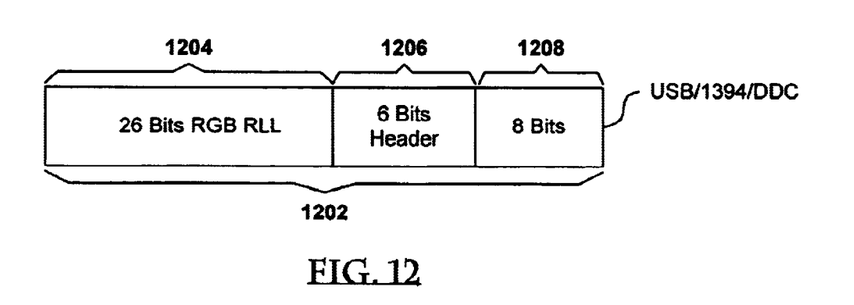
FIG. 12 shows the content of a third embodiment of the video data stream of the present invention in which a data width is used which allows the video pixel clock to remain unaltered but allows the maximum latency bandwidth of the bus systems to be accommodated.
Figure 13:
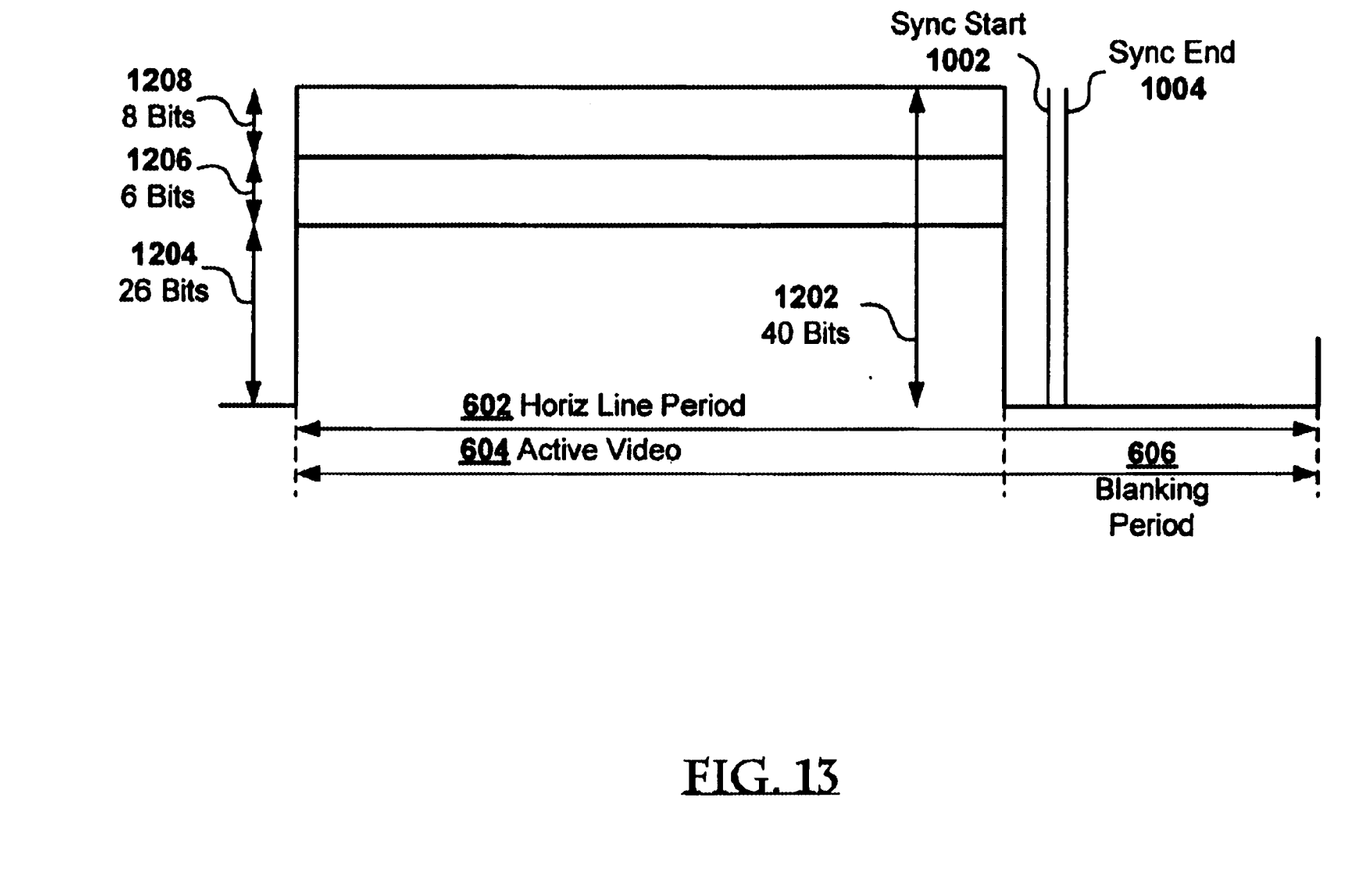
FIG. 13 shows the data that is sent for each horizontal line period of the video data stream of FIG. 12.

FIG. 12 shows a third embodiment of the present invention. This embodiment has a data width of 40 bits which allows the video pixel clock to remain unaltered but allows the maximum latency bandwidth of the bus systems to be accommodated. The bus systems are able to communicate across the channel in the video blanking period in the same manner as described above with reference to the second embodiment. This embodiment has the advantage that it can be expanded to carry additional data, that the data latency is low, but it requires that the data rate is increased greatly.

FIG. 12 shows, at 1202, the expanded 40 bit data word which consists of 26 bits 1204 representing 24 bits of Red, Green and Blue video data and 2 bits of video RLL, 6 bits 1206 representing header and error correction data and 8 bits 1208 representing 7 bits of USB data, IEEE 1394 data, DDC data as well as 1 bit of RLL data. The number of bits of USB data, IEEE 1394 data and DDC data may be varied from the 7 bits in the example above and will be represented by N, in the following table. The total data word is 33+N bits wide. The values of N, together with the total word length in parentheses, are as follows (assuming that 15 Mbit/s is allocated for USB/DDC data):

| Pixel Clock | 1394-200 | 1394-400 |
|---|---|---|
| 40 MHz | 6 (39) | 11 (44) |
| 50 MHz | 5 (38) | 9 (42) |
| 65 MHz | 4 (37) | 7 (40) |

1394-200 represents 200 Mbits/s being allocated to IEEE 1394 communications and 1394-400 represents 400 Mbits/s being allocated to IEEE 1394 communications. From these new word lengths, the channel data rate can be readily calculated to be:

| Pixel Clock | 1394-200 | 1394-400 |
|---|---|---|
| 40 MHz | 1560 Mbit/s | 1760 Mbit/s |
| 50 MHz | 1900 Mbit/s | 2100 Mbit/s |
| 65 MHz | 2405 Mbit/s | 2600 Mbit/s |

In a preferred embodiment, for simplicity, a common word length is recommended. In order to support all of the above options the longest word length is used, that is 44 bits per word.

The channel data and symbol rates now become:

| Pixel Clock | Data Rate |
|---|---|
| 40 MHz | 1760 Mbit/s |
| 50 MHz | 2200 Mbit/s |
| 65 MHz | 2860 Mbit/s |

In a variation of the preferred embodiment, a further video rate is supported.

| Format | Resolution | Frame Rate | Pixel Clock | Data Rate |
|---|---|---|---|---|
| SXGA | 1280 × 1024 | 60 Hz | 112 MHz | 2688 Mbit/s |

With this pixel clock rate and 400 Mbit/s allocated for IEEE1394 data (and again assuming 15 Mbit/s for USB and DDC) we require N=4. The channel data rate for this case is then 4.144 Gbit/s.

However, if a 40 MHz pixel clock with a fixed data format needs to be supported by this variation, then a 44 bit word is required which needs a channel data rate of 4.928 Gbit/s. In the preferred embodiment clock multiplication is employed. The clock rates are multiplied as follows:

| Basic Pixel Rate | Multiplication | Final Rate |
|---|---|---|
| 25 MHz | 4 | 100 MHz |
| 40 MHz | 2 | 80 MHz |
| 65 MHz | 1 | 65 MHz |
| 112 MHz | 1 | 112 MHz |

The extreme rates are then 65 MHz and 112 MHz. The 112 MHz case is dealt with above and for 65 MHz we need N=7 and and therefore the maximum channel rate for support of SXGA with a fixed data format is 4.480 Gbit/s. The range of data rates is now 2600 Mbit/s to 4480 Mbit/s.

In a variation of the preferred embodiment, DC coupling removes the needs for the RLL bits reducing the maximum rate from 4480 Mbit/s to 4144 Mbit/s.

What is claimed is:

1. Apparatus comprising:
a circuit which produces an isochronous output data stream which is time multiplexed and has a fixed time period where input isochronous and asynchronous data streams are multiplexed into the isochronous output data stream, and the output data stream is provided the same data rate as the fastest input isochronous data stream, wherein the data streams include 1394 and USB data streams, and wherein one or more of the data streams contain a code which has been run length limited and comprises a zero running digital sum with banded disparity.

2. Apparatus of claim 1 wherein at least one of the input streams as well as the output data stream contains a code which has been error detected and corrected.

3. Apparatus of claim 2 wherein one of the isochronous data streams is update or refresh data to a display transducer.

4. Apparatus of claim 3 wherein one of the isochronous data streams is isochronous 1394 or USB, SIM or RS-442 and wherein a real time bandwidth within the output data stream is allocated isochronously to meet bus specifications of USB and 1394 as well as a data refresh rate.

5. Apparatus of claim 4 wherein one of the asynchronous data streams is asynchronous 1394, asynchronous USB, DDC, I2C or ATM.

6. Apparatus of claim 5 wherein the time multiplexed output data stream is divided into time slices which are allocated on a predetermined programmable basis.

7. The apparatus of claim 1, wherein the isochronous input data is unidirectional and the asynchronous input data is bidirectional and wherein said isochronous output data comprises a plurality of bits with at least a first bit having isochronous data, a second bit having asynchronous data, and a header,bit, said output data being formatted as a 2-bit wide serial data.

8. The apparatus of claim 1, wherein said isochronous output data has a word length that is a sum of the word length of the isochronous input data and additional bits for one or more of bus data, headers, run length limiting information, error correction, calibration data and flags, wherein at least one of said additional bits contains said asynchronous data, and wherein for a 32 bit word implementation, 24 bits are utilized for isochronous input data, 5 bits for asynchronous input data, 1 bit for USB data, and 2 bits for header.

9. Apparatus comprising:
a circuit which produces an isochronous output data stream which is time multiplexed and has a fixed time period in which input isochronous and asynchronous data streams are multiplexed into the isochronous output data stream and the size of the output data stream is the sum of the maximum input isochronous and asynchronous data streams, wherein the data streams include 1394 and USB data streams, wherein a real time bandwidth within the output data stream is allocated isochronously to meet bus specifications of USB and 1394 as well as a data refresh rate, and wherein one or more of the data streams contain a code which has been run length limited and comprises a zero running digital sum with banded disparity.

10. Apparatus of claim 9 wherein the output data stream comprises a word that contains a code which has been error detected and corrected.

11. Apparatus of claim 10 wherein one of the isochronous data streams is update or refresh data to a display transducer.

12. Apparatus of claim 11 wherein one of the isochronous data streams is isochronous 1394 or USB, STM or RS-442.

13. Apparatus of claim 10 wherein one of the asynchronous data streams is asynchronous 1394, asynchronous USB, DDC, I2C or ATM.

14. Apparatus of claim 13 herein the time multiplexed output data stream is divided into time slices which are allocated on a predetermined programmable basis.

15. The apparatus of claim 9 further comprising a parallel-to-serial multiplex encoder which converts an X bit input signal into an X+Y bit output signal, where X and Y are integers, and run-length limits the signals to X bit long, wherein said parallel-to-serial multiplex encoder outputs said signal as an N bit encoded word that is 2 bits wide.

16. Apparatus comprising:
a circuit which produces an n bit wide word format sent as a single data stream that contains (1) multiple isochronous data streams either continuous or non-continuous with different data rates and (2) asynchronous data stream or streams, wherein the data streams include 1394 and USB data streams, and wherein the data streams have one or more of the data streams contain a code which has been run length limited and comprises a zero running digital sum with banded disparity, and wherein further, the transmission rate of the single data stream produces is equal to a fastest transmission rate among transmission rates for each of said multiple isochronous data streams.

17. Apparatus of claim 16 wherein the word contains a code which has been error detected and corrected.

18. Apparatus of claim 16 wherein one of the isochronous data streams is update or refresh data to a display transducer.

19. Apparatus of claim 16 wherein one of the isochronous data streams is isochronous 1394 or USB, STM or RS-442 and wherein a real time bandwidth within output data stream is allocated isochronously to meet bus specifications of USB and 1394 as well as a data refresh rate.

20. Apparatus of claim 16 wherein one or more of the asynchronous data streams is asynchronous 1394, asynchronous USB, DDC, 12C or ATM.

* * * * *